(12) United States Patent
Harris et al.

(10) Patent No.: US 7,539,183 B2
(45) Date of Patent: *May 26, 2009

(54) MULTI-SERVICE PLATFORM SYSTEM AND METHOD

(75) Inventors: Jeffrey M. Harris, Chandler, AZ (US); Robert Tufford, Chandler, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 1401 days.

This patent is subject to a terminal disclaimer.

(21) Appl. No.: 10/178,670

(22) Filed: Jun. 24, 2002

(65) Prior Publication Data

US 2003/0236920 A1 Dec. 25, 2003

(51) Int. Cl.
*H04L 12/56* (2006.01)
*H04J 1/16* (2006.01)

(52) U.S. Cl. .................. 370/386; 370/369; 361/686; 710/305

(58) Field of Classification Search .................. 370/217, 370/352–356, 400, 465, 466, 401, 369, 375, 370/380, 386–388, 419, 422, 423, 463; 702/187; 455/435.2; 361/679, 685, 686; 710/100, 710/305; 379/88.02
See application file for complete search history.

(56) References Cited

U.S. PATENT DOCUMENTS

| | | | | | |
|---|---|---|---|---|---|
| 5,581,600 | A | * | 12/1996 | Watts et al. | 379/88.02 |
| 5,682,328 | A | * | 10/1997 | Roeber et al. | 702/187 |
| 5,881,135 | A | * | 3/1999 | Watts et al. | 379/88.02 |
| 5,999,813 | A | * | 12/1999 | Lu et al. | 455/435.2 |
| 6,104,613 | A | * | 8/2000 | Urda et al. | 361/704 |
| 6,328,572 | B1 | * | 12/2001 | Higashida et al. | 439/61 |
| 6,377,470 | B1 | * | 4/2002 | Hayward et al. | 361/796 |
| 6,799,202 | B1 | * | 9/2004 | Hankinson et al. | 709/219 |
| 6,981,086 | B2 | * | 12/2005 | Wetzel et al. | 710/300 |
| 7,339,786 | B2 | * | 3/2008 | Bottom et al. | 361/686 |
| 2002/0194412 | A1 | * | 12/2002 | Bottom | 710/302 |
| 2003/0097487 | A1 | * | 5/2003 | Rietze et al. | 709/325 |
| 2003/0210522 | A1 | * | 11/2003 | Rietze et al. | 361/685 |
| 2004/0078506 | A1 | * | 4/2004 | Wong et al. | 710/301 |
| 2005/0259571 | A1 | * | 11/2005 | Battou | 370/217 |
| 2008/0212276 | A1 | * | 9/2008 | Bottom et al. | 361/686 |

OTHER PUBLICATIONS

VME Technology FAQ, What is the 'P0/J0' connector? by Wade D. Peterson 2000 (No month available) Retrieved from the internet :<http://www.vita.com/vmefaq.html>.*

(Continued)

*Primary Examiner*—John Pezzlo
(74) *Attorney, Agent, or Firm*—Harness, Dickey & Pierce, P.L.C.

(57) ABSTRACT

A multi-service platform system (100, 200) including a VMEbus network (102) and a switched fabric network (104) wherein the VMEbus network (102) and the switched fabric network (104) operate concurrently within the multi-service platform system (100, 200). Multi-service platform system (100, 200) can include a payload module (106) with a first switched fabric connector (210) in a P0 mechanical envelope (218) that is designed to interface with a corresponding first switched fabric connector (212) in the J0 mechanical envelope (220) on a backplane (204).

19 Claims, 4 Drawing Sheets

OTHER PUBLICATIONS

Keying CompactPCI Backplanes and Boards by Joe Pavlat Spring 1998.*

Dual-8-Port VME-form-factor Myrinet-SAN Switch by Myricom Jan. 6, 2000.*

CHM 2.0 Connector System acc. to IEC 61076-4-101 by Cannon ITT industries, 1999, (no month available).*

VICB8002 VME 64x Industry Pack Carrier Board User's Manual by MRN, Feb. 14, 2000, Hytec Electronics Ltd.*

VME (P2) Add on Buses, by Leroy Davis, Dec. 31, 2000, retrived from the internet "www.interfacebus.com/Design_connector_VME_P2_Buses.html".*

"Serial I/O on 2 mm Connectors Draft Standard VITA 31 - 20x", Draft 0.5, Jan. 9, 2001, VITA Standards Organization, Scottsdale, Arizona, USA.

"American National Standard for Gigabit Ethernet on VME64x Backplanes", VMEbus International Trade Association, Approved Jun. 2003, American, Approved Jun. 2003, American National Standards Institute, Inc., Fountain Hills, Arizona, USA.

* cited by examiner

MULTI-SERVICE PLATFORM SYSTEM AND METHOD

BACKGROUND OF THE INVENTION

In current embedded computer platforms, such as VERSAmodule Eurocard (VMEbus) systems, the shared multi-drop bus can only be used to support one simultaneous communication between payload modules in the network. However, some applications have requirements for simultaneous high bandwidth transfers between payload cards in the VMEbus system that cannot be handled by the shared multi-drop architecture of VMEbus. It is desirable to configure current VMEbus systems to accommodate high-speed data transfers while maintaining the existing VMEbus network architecture.

Accordingly, there is a significant need for an apparatus and method that overcomes the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Figure 1:
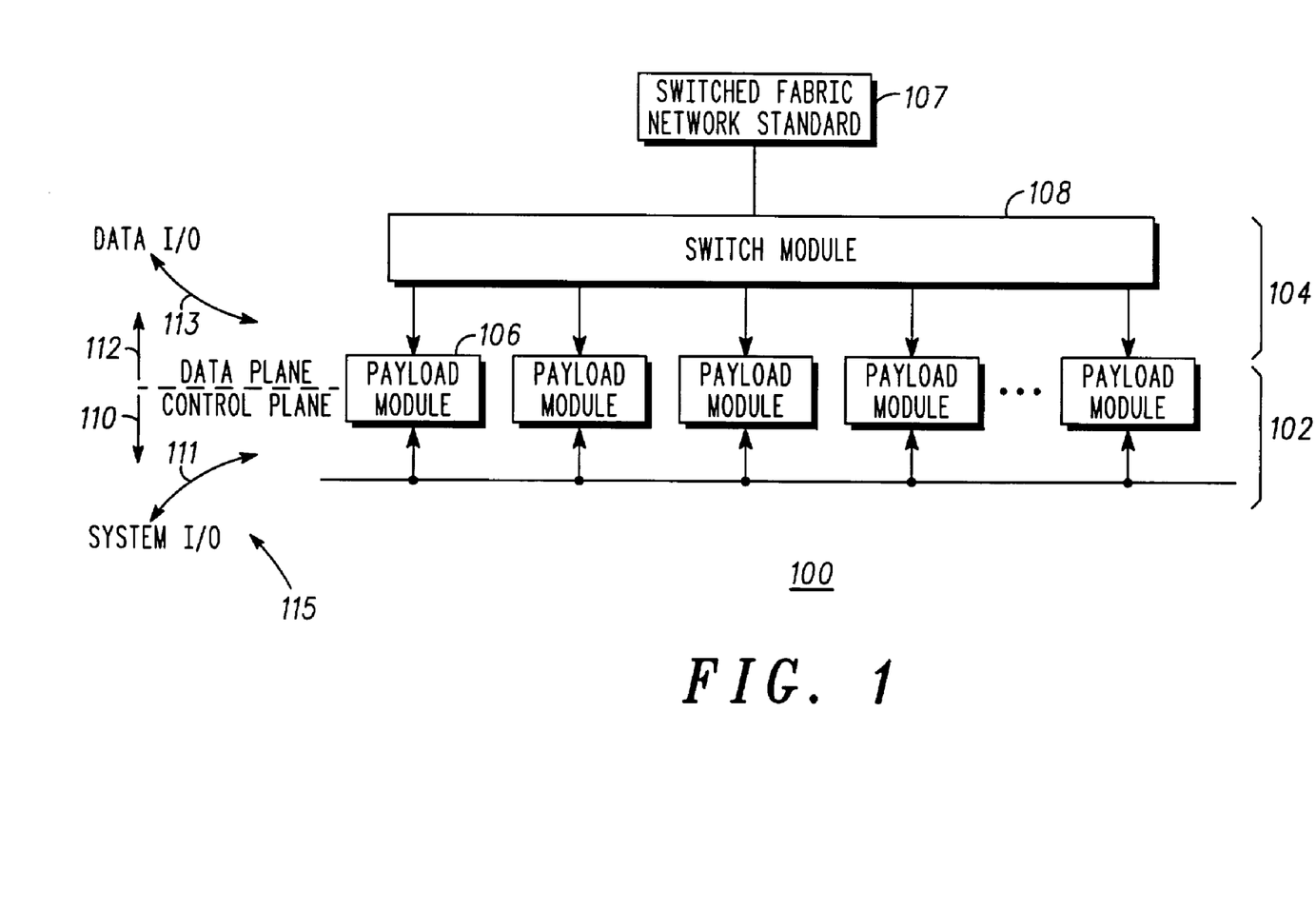
FIG. 1 depicts a multi-service platform system according to one embodiment of the invention.

FIG. 1 depicts a multi-service platform system 100 according to one embodiment of the invention. As shown in FIG. 1, multi-service platform system 100 can comprise a VERSAmodule Eurocard (VMEbus) network 102 and a switched fabric network 104 coupled to any number of payload modules 106. Payload module 106 can add functionality to multi-service platform system 100 through the addition of processors, memory, storage devices, I/O elements, and the like. In other words, payload module 106 can include any combination of processors, memory, storage devices, I/O elements, and the like, to give multi-service platform the functionality desired by a user.

Multi-service platform system 100 is controlled by a platform controller (not shown for clarity), which can include a processor for processing algorithms stored in memory. Memory comprises control algorithms, and can include, but is not limited to, random access memory (RAM), read only memory (ROM), flash memory, electrically erasable programmable ROM (EEPROM), and the like. Memory can contain stored instructions, tables, data, and the like, to be utilized by processor. Platform controller can be contained in one, or distributed among two or more payload modules 106 with communication among the various payload modules of multi-service platform system 100 occurring via VMEbus network 102 or switched fabric network 104. Platform controller can also be contained on switch module 108. Platform controller can control the functionality of multi-service platform system 100 including managing any payload modules 106 placed in the slots of a chassis to add functionality to the multi-service platform system 100.

VMEbus network 102 is a parallel multi-drop bus network that is known in the art. VMEbus network 102 is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus network 102 can include VMEbus based protocols such as Single Cycle Transfer protocol (SCT), Block Transfer protocol (BLT), Multiplexed Block Transfer protocol (MBLT), Two Edge VMEbus protocol (2eVME) and Two Edge Source Synchronous Transfer protocol (2eSST). VMEbus network 102 is not limited to the use of these VMEbus based protocols and other VMEbus based protocols are within the scope of the invention.

Switched fabric network 104 uses switch module 108 as a central switching hub with any number of payload modules 106 coupled to switch module 108. Switched fabric network 104 can be based on a point-to-point, switched input/output (I/O) fabric, whereby cascaded switch devices interconnect end node devices. Switched fabric network 104 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment). Switched fabric network 104 can be implemented by using one or more of a plurality of switched fabric network standards 107, for example and without limitation, InfiniBand™, Serial RapidIO™, FibreChannel™, Ethernet™, PCI Express™, Hypertransport™, and the like. Switched fabric network 104 is not limited to the use of these switched fabric network standards and the use of any switched fabric network standard is within the scope of the invention.

In an embodiment of the invention, VMEbus network 102 and switched fabric network 104 operate concurrently 115 within multi-service platform system 100. In one embodiment, switched fabric network 104 can operate in parallel with VMEbus network 102 in a multi-service platform system 100 that is defined by the ANSI/VITA 1-1994 and ANSI/VITA 1.1-1997 standards. In an example of an embodiment, VMEbus network 102 can operate as a control plane 110 by synchronizing and organizing activities in multi-service platform system 100. This is represented in FIG. 1 by the control plane 110 sending and receiving system I/O 111. Switched fabric network 104 can operate as a data plane 112 by transferring data between individual payload modules 106. This is represented in FIG. 1 by the data plane 112 sending and receiving data I/O 113. In this embodiment, data is transferred faster through the higher bandwidth switched fabric network 104, while the VMEbus network 102 controls and manages the overall system. This has the effect of increasing the speed of multi-service platform system 100 that is based on VMEbus specifications since data transfers that are in excess of VMEbus network 102 bandwidth can take place using switched fabric network 104.

In another embodiment of the invention, VMEbus network 102 can be used as the data plane 112 and switched fabric network 104 can be used as the control plane 110. In yet another embodiment of the invention, VMEbus network 102 and switched fabric network 104 each can operate as both the control plane 110 and the data plane 112.

Figure 2:
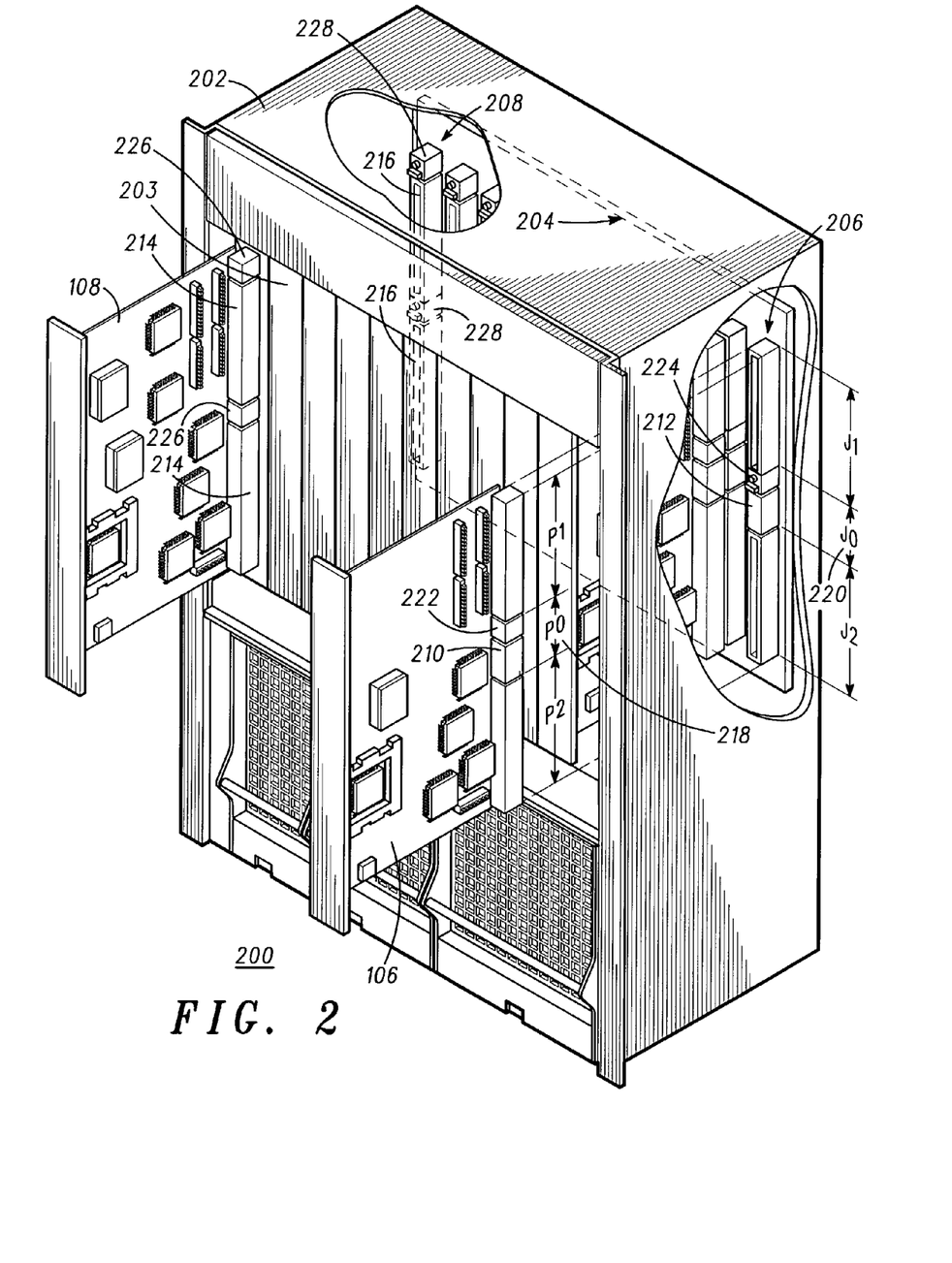
FIG. 2 depicts a multi-service platform system according to an embodiment of the invention.

FIG. 2 depicts a multi-service platform system 200 according to an embodiment of the invention. As shown in FIG. 2, multi-service platform system 200 can include a multi-service platform system chassis 202, with software and any number of slots 203 for inserting modules. In one embodiment a backplane 204 is used for connecting modules placed in slots 203. As an example of an embodiment, a multi-service platform system 200 can include model MVME5100 manufactured by Motorola Computer Group, 2900 South Diablo Way, Tempe, Ariz. 85282. The invention is not limited to this model or manufacturer and any multi-service platform system is included within the scope of the invention.

Backplane 204 includes a first slot 206, which is designed to receive payload module 106. In an embodiment of the invention, backplane 204 and payload module 106 have a set of interlocking connectors designed to interlock with each other when payload module 106 is placed in first slot 206. The mechanical and electrical specifications for a portion of these interlocking connectors can be found in the ANSI/VITA 1-1994 and ANSI/VITA 1.1-1997 standards for VMEbus systems. For example, these standards define the mechanical envelope shown as P0, P1 and P2 on payload module, and corresponding mechanical envelopes J0, J1 and J2 on backplane 204 such that connectors in the P1/J1 and P2/J2 mechanical envelopes interlock when payload module 106 is placed in first slot 206 of multi-service platform system chassis 202. For example, payload module 106 has one portion of an interlocking connector in the in the P1 mechanical envelope designed to interlock with its corresponding portion located in the J1 mechanical envelope on the backplane 204 of first slot 206. Also, payload module 106 can have an interlocking connector in the P2 mechanical envelope designed to interlock with its corresponding portion located in the J2 mechanical envelope on the backplane 204 of first slot 206.

In an embodiment of the invention, connectors in the P1/J1 and P2/J2 mechanical envelopes are for VMEbus network 102, while the P0/J0 mechanical envelope can be customized to fit unique applications. When payload module 106 is placed in first slot 206 and coupled to backplane 204 via connectors in the P1/J1 and P2/J2 mechanical envelopes, the functionality of payload module 106 is added to multi-service platform system 200 via VMEbus network 102. For example, processors, memory, storage devices, I/O elements, and the like, on payload module 106 are accessible by other payload modules and visa versa.

In an embodiment of the invention, payload module 106 has first switched fabric connector 210 in the P0 mechanical envelope 218. Backplane 204 includes corresponding first switched fabric connector 212 in the J0 mechanical envelope 220, where first switched fabric connector 210 and corresponding first switched fabric connector 212 are designed to interface and interlock when payload module 106 is inserted into first slot 206. First switched fabric connector 210 and corresponding first switched fabric connector 212 are designed for use in high-speed switched fabric networks and are compatible with any of a plurality of switched fabric network standards 107 such as InfiniBand, Serial RapidIO, FibreChannel, Ethernet, PCI Express, Hypertransport, and the like. In an example of an embodiment of the invention, first switched fabric connector 210 and corresponding first switched fabric connector 212 can be a Tyco MultiGig RT-3 connector manufactured by the AMP division of Tyco Electronics, Harrisburg, Pa. The invention is not limited to the use of the Tyco RT-3 connector, and any connector capable of handling data using any of the plurality of switched fabric network standards 107 is encompassed within the invention.

In an embodiment of the invention, payload module 106 can include a payload module keying mechanism 222 in the P0 mechanical envelope 218 that uniquely corresponds to one of the plurality of switched fabric network standards 107. Also, backplane 204 can include a corresponding payload module keying mechanism 224 in the J0 mechanical envelope 220 that uniquely corresponds to one of the plurality of switched fabric network standards 107. Payload module keying mechanism 222 and corresponding payload module keying mechanism 224 are designed to interconnect when both correspond to the same one of the plurality of switched fabric network standards 107. Corresponding payload module keying mechanism 224 is designed to preclude coupling of an incompatible payload module to the backplane in first slot 206. An incompatible payload module has payload module keying mechanism 222 that does not interface with corresponding payload module keying mechanism 224. This can occur, for example and without limitation, because each of the keying mechanisms does not correspond to the same one of the plurality of switched fabric network standards.

In an embodiment of the invention, multi-service platform system 200 includes switch module 108 and second slot 208, where second slot 208 and backplane 204 are designed to receive switch module 108. Switch module 108 can have second switched fabric connector 214 and backplane 204 can include corresponding second switched fabric connector 216, where second switched fabric connector 214 and corresponding second switched fabric connector 216 are designed to interface when switch module 108 is inserted into second slot 208. Second switched fabric connector 214 and corresponding second switched fabric connector 216 operate to couple switch module to plurality of payload modules 106 through backplane 204. Second switched fabric connector 214 and corresponding second switched fabric connector 216 are designed for use in high-speed switched fabric networks and are compatible with any of a plurality of switched fabric network standards 107 such as InfiniBand, Serial RapidIO, FibreChannel, Ethernet, PCI Express, Hypertransport, and the like.

When switch module 108 is inserted in second slot 208, switch module 108 is coupled to payload module 106 via corresponding first switched fabric connector 212 through backplane as shown in FIG. 1. Switch module 108 can also be coupled to plurality of payload modules 106 as shown in FIG. 1 via backplane through each respective corresponding first switched fabric connector. When switch module 108 is coupled to backplane 204, payload module 106 and switch module 108 can communicate using switched fabric network 104 via first switched fabric connector 210.

In an embodiment of the invention, switch module 108 can include a switch module keying mechanism 226 that uniquely corresponds to one of the plurality of switched fabric network standards 107. Also, backplane 204 can include a corresponding switch module keying mechanism 228 that uniquely corresponds to one of the plurality of switched fabric network standards 107. Switch module keying mechanism 226 and corresponding switch module keying mechanism 228 are designed to interconnect when both correspond to the same one of the plurality of switched fabric network standards 107. Corresponding switch module keying mechanism 228 is designed to preclude coupling of an incompatible switch module to the backplane in second slot 208. An incompatible switch module has switch module keying mechanism 226 that does not interface with corresponding switch module keying mechanism 228. This can occur, for example and without limitation, because each of the keying mechanisms corresponds to a unique one of the plurality of switched fabric network standards. FIG. 2 shows two each of switch module keying mechanism 226 and corresponding switch module keying mechanism 228. However, fewer than two or more than two switch module keying mechanisms 226 and corresponding switch module keying mechanisms 228 are included within the scope of the invention.

Figure 3:
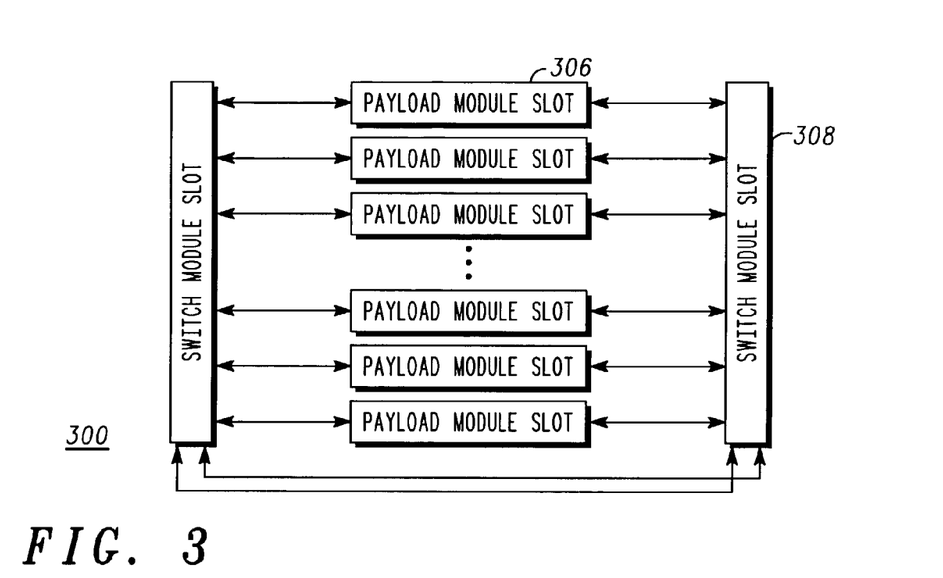
FIG. 3 depicts a switched fabric network configuration according to an embodiment of the invention.

FIG. 3 depicts a switched fabric network configuration 300 according to an embodiment of the invention. As shown in FIG. 3, payload module slots 306 and switch module slots 308 can be configured in a redundant dual-star configuration, where each payload module slot 306 is coupled to two separate switch module slots 308. This allows for redundancy in multi-service platform system 100, 200 by allowing payload modules 106 inserted in payload module slots 306 to use either switch module 108 inserted in switch module slot 308 to access multi-service platform system 100, 200 and other payload modules 106 within multi-service platform system 100, 200. Also, switch modules 108 can communicate with each other over switched fabric network 104 as represented by the arrows connecting each switch module slot 308.

Figure 4:
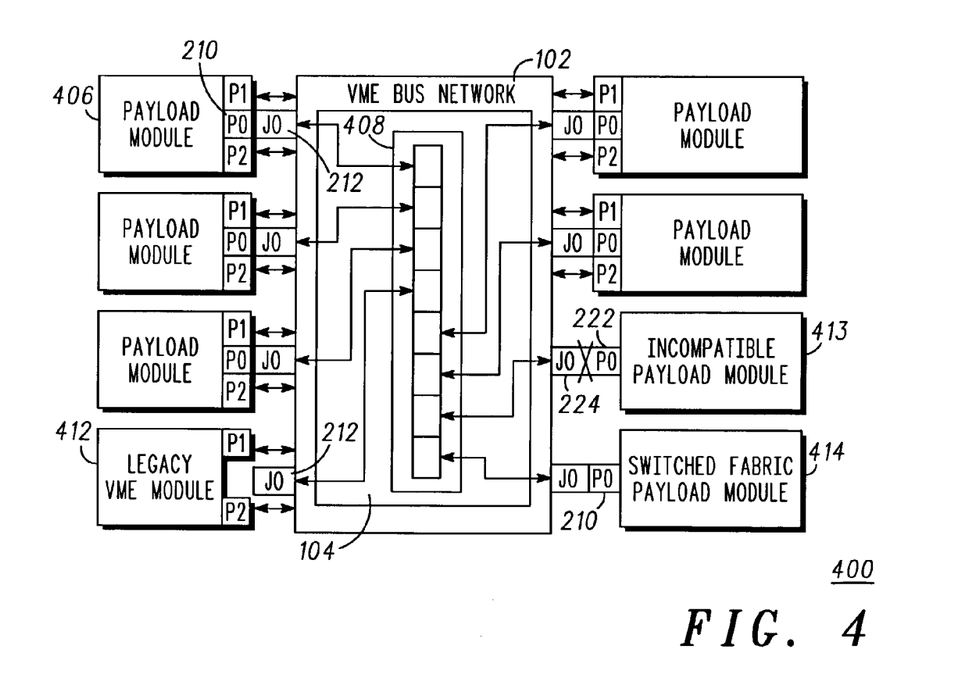
FIG. 4 depicts a switched fabric network configuration according to another embodiment of the invention.

FIG. 4 depicts a switched fabric network configuration 400 according to another embodiment of the invention. As shown in FIG. 4, switch module 408 can be coupled to payload modules 406, legacy VME modules 412 and switched fabric payload modules 414. As described above, connectors in the P1 and P2 mechanical envelope on payload modules 106 are coupled to VMEbus network 102. In an embodiment of the invention, first switched fabric connector 210 in the P0 mechanical envelope is coupled to switch module 408. Although the switched fabric network configuration 400 shown in FIG. 4 depicts eight payload modules coupled to switch module 108, any number of payload modules coupled to switch module is within the scope of the invention.

In an embodiment of the invention, legacy VME module 412 can be coupled to VMEbus network 102 even with the presence of corresponding first switched fabric connector 212 on the backplane 204 of a particular slot. Legacy VME module 412 can be a payload module without a first switched fabric connector 210 in the P0 mechanical envelope 218. In another embodiment, legacy VME module 412 can be a payload module that has a connector in the P0 mechanical envelope 218 that does not mechanically interfere with corresponding first switched fabric connector 212 on backplane. In this manner, legacy VME modules 412 can still be used in multi-service platform system 100, 200 having both VMEbus network 102 and switched fabric network 104.

In another embodiment, switched fabric payload module 414 can couple to switch module 408, where switched fabric payload module 414 only has first switched fabric connector 210 and couples solely to switched fabric network 104. In this embodiment, switched fabric payload module 414 is not coupled to VMEbus network 102 and transfers data solely using switched fabric network 104.

In still another embodiment, corresponding payload module keying mechanism 224 is designed to preclude coupling of an incompatible payload module 413 to the backplane. An incompatible payload module 413 can include a payload module that has payload module keying mechanism 222 and corresponding payload module keying mechanism 224 that do not correspond to the same one of the plurality of switched fabric network standards, as represented by the "X" through the P0/J0 interface of the incompatible payload module 413. In another embodiment, an incompatible switch module is precluded from coupling to the backplane in an analogous manner through the use of keying mechanisms and connector placement.

Figure 5:
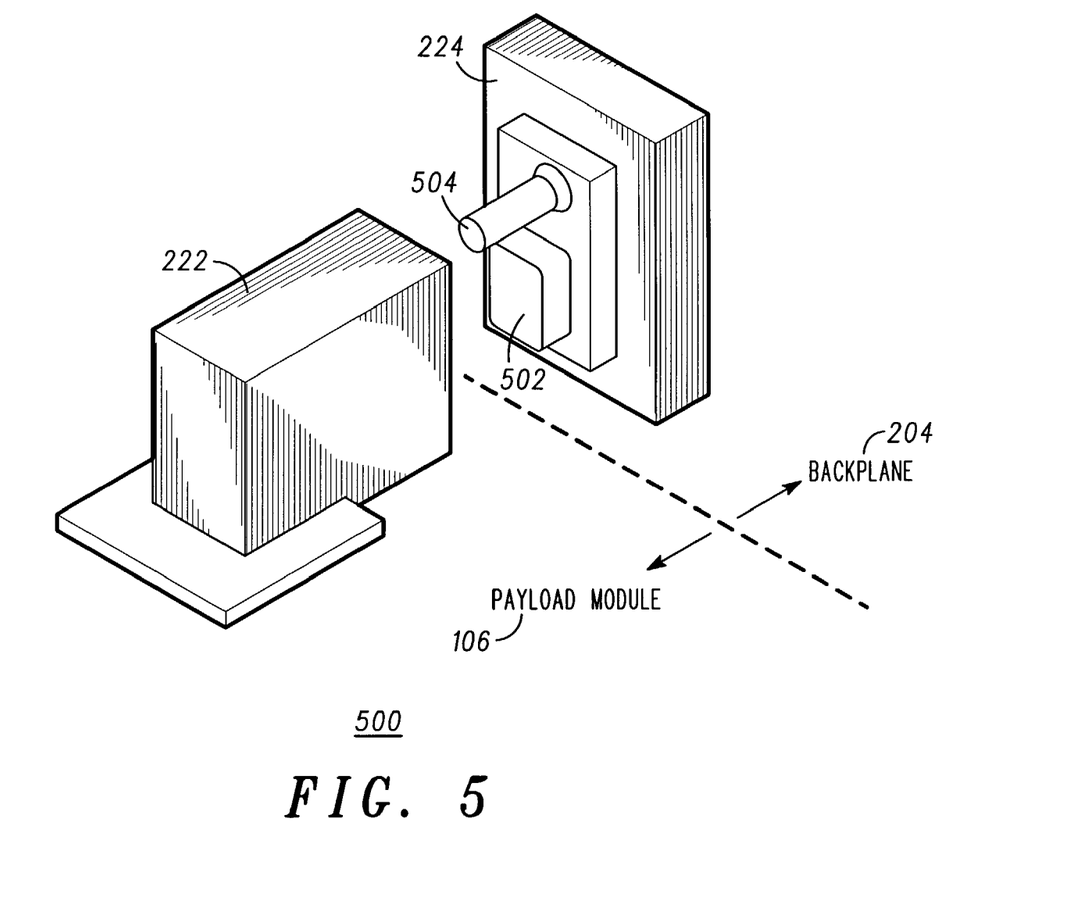
FIG. 5 depicts an isometric of keying mechanisms according to an embodiment of the invention.

FIG. 5 depicts an isometric 500 of keying mechanisms according to an embodiment of the invention. As shown in FIG. 5, keying mechanisms for payload module can include payload module keying mechanism 222 located on payload module 106, and corresponding payload module keying mechanism 224 located on backplane 204. Payload module keying mechanism 222 and corresponding payload module keying mechanism 224 ensure that any connectors located in the P0 mechanical envelope 218 on payload module 106 cannot connect with incompatible connectors located in the J0 mechanical envelope 220 on backplane 204. Incompatibility can occur due to type of connector, position of connector within P0 mechanical envelope 218 or J0 mechanical envelope 220, electrical incompatibility of connectors, and the like.

In an embodiment of the invention, payload module keying mechanism 222 and corresponding payload module keying mechanism 224 can have two features that must correspond to each other before connectors are allowed to interconnect. First, a key feature 502 can include a unique cross-sectional shape such as a square, rectangle, star, triangle, circle and the like of a specific dimension and/or cross-section that corresponds to one of the plurality of switched fabric network standards 107. For example, one of the plurality of switched fabric network standards 107 can require a square cross-section of a specific dimension on corresponding payload module keying mechanism 224 match an available opening of similar dimensions on payload module keying mechanism 222. Second, an alignment feature 504 can perform a similar function as key feature 502 in addition to aligning payload module 106 in first slot 206 to ensure proper interconnection of payload module 106 into backplane 204. Methods of employing keying mechanisms outside of this invention, including key features and alignment features, are known in the art. Switch module keying mechanism 226 and corresponding switch module keying mechanism 228 are analogous to payload module keying mechanism 222 and corresponding payload module keying mechanism 224 described above.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A multi-service platform system comprising:
    a VMEbus network;
    a switched fabric network, wherein the VMEbus network and the switched fabric network operate concurrently within the multi-service platform system and wherein the switched fabric network uses one of InfiniBand, Serial RapidIO, FibreChannel, Ethernet, PCI Express and Hypertransport switched fabric network standards;
    a payload module having a first switched fabric connector in a P0 mechanical envelope on the payload module; and
    a multi-service platform system chassis having a backplane and a first slot, wherein the backplane and the first slot are designed to receive the payload module, and wherein the backplane comprises a corresponding first switched fabric connector in a J0 mechanical envelope designed to interface with the first switched fabric connector.

2. The multi-service platform system of claim 1, wherein the VMEbus network operates as a control plane, and wherein the switched fabric network operates as a data plane.

3. The multi-service platform system of claim 1, further comprising a plurality of switched fabric network standards, wherein the payload module includes a payload module keying mechanism in the P0 mechanical envelope that uniquely corresponds to one of the plurality of switched fabric network standards, wherein the backplane includes a corresponding payload module keying mechanism in the J0 mechanical envelope that uniquely corresponds to one of the plurality of switched fabric network standards, and wherein the payload module keying mechanism and the corresponding payload module keying mechanism are designed to interconnect when both correspond to a same one of the plurality of switched fabric network standards.

4. The multi-service platform system of claim 3, wherein the corresponding payload module keying mechanism precludes coupling of an incompatible payload module to the backplane.

5. The multi-service platform system of claim 1, further comprising a plurality of switched fabric network standards, wherein the first switched fabric connector is compatible with any of the plurality of switched fabric network standards.

6. The multi-service platform system of claim 1, wherein the corresponding first switched fabric connector is configured to allow coupling of a legacy VME module to the backplane in the first slot.

7. The multi-service platform system of claim 1, further comprising a switch module, wherein the multi-service platform system chassis further comprises a second slot, wherein the backplane and the second slot are designed to receive the switch module, and wherein the switch module is coupled to the corresponding first switched fabric connector through the backplane.

8. The multi-service platform system of claim 7, further comprising a plurality of switched fabric network standards, wherein the switch module includes a switch module keying mechanism that uniquely corresponds to one of the plurality of switched fabric network standards, wherein the backplane includes a corresponding switch module keying mechanism that uniquely corresponds to one of the plurality of switched fabric network standards, and wherein the switch module keying mechanism and the corresponding switch module keying mechanism are designed to interconnect when both correspond to a same one of the plurality of switched fabric network standards.

9. The multi-service platform system of claim 7, wherein the corresponding switch module keying mechanism precludes coupling of an incompatible switch module to the backplane.

10. The multi-service platform system of claim 7, wherein the payload module and the switch module communicate using the switched fabric network via the first switched fabric connector.

11. The multi-service platform system of claim 7, further comprising a plurality of payload modules, wherein the switch module is coupled to the plurality of payload modules.

12. A payload module designed to operate within a multi-service platform system chassis having a VMEbus network and a switched fabric network that operate concurrently comprising:
    a first switched fabric connector in a P0 mechanical envelope on the payload module, wherein the first switched fabric connector is designed to interface with a corresponding first switched fabric connector on a backplane of the multi-service platform system chassis; and
    a payload module keying mechanism in the P0 mechanical envelope that uniquely corresponds to one of a plurality of switched fabric network standards.

13. The payload module of claim 12, wherein the first switched fabric connector is compatible with any of the plurality of switched fabric network standards.

14. The payload module of claim 12, wherein the switched fabric network uses one of InfiniBand, Serial RapidIO, FibreChannel, Ethernet, PCI Express and Hypertransport switched fabric network standards.

15. A method of operating a multi-service platform system, comprising:
    providing a VMEbus network and a switched fabric network that operate concurrently within the multi-service platform system;
    providing a payload module having a first switched fabric connector in a P0 mechanical envelope on the payload module, wherein the payload module is coupled to the multi-service platform system via a first slot and a backplane;
    providing a switch module, wherein the switch module is coupled to the multi-service platform system via a second slot and the backplane; and
    the payload module and the switch module communicating using the switched fabric network.

16. The method of claim 15, further comprising:
    the VMEbus network operating as a control plane; and
    the switched fabric network operating as a data plane.

17. The method of claim 15, further comprising the switched fabric network using one of InfiniBand, Serial RapidIO, FibreChannel, Ethernet, PCI Express and Hypertransport switched fabric network standards.

18. The method of claim 17, further comprising the multi-service platform system using a corresponding payload module keying mechanism in a J0 mechanical envelope that uniquely corresponds to one of a plurality of switched fabric network standards to preclude coupling of an incompatible payload module to the backplane.

19. The method of claim 17, further comprising the multi-service platform system using a corresponding switch module keying mechanism that uniquely corresponds to one of a plurality of switched fabric network standards to preclude coupling of an incompatible switch module to the backplane.

* * * * *